United States Patent
Delaney et al.

(10) Patent No.: US 6,877,109 B2
(45) Date of Patent: Apr. 5, 2005

(54) METHOD FOR THE ACCELERATION AND SIMPLIFICATION OF FILE SYSTEM LOGGING TECHNIQUES USING STORAGE DEVICE SNAPSHOTS

(75) Inventors: William P. Delaney, Wichita, KS (US); Rodney A. DeKoning, Augusta, KS (US)

(73) Assignee: LSI Logic Corporation, Milpitas, CA (US)

( * ) Notice: Subject to any disclaimer, the term of this patent is extended or adjusted under 35 U.S.C. 154(b) by 454 days.

(21) Appl. No.: 10/001,889

(22) Filed: Nov. 19, 2001

(65) Prior Publication Data

US 2003/0097611 A1 May 22, 2003

(Under 37 CFR 1.47)

(51) Int. Cl.[7] .................................................. G06F 11/00
(52) U.S. Cl. ............................................... 714/6; 714/7
(58) Field of Search ...................... 714/6, 7; 707/202

(56) References Cited

U.S. PATENT DOCUMENTS

| 5,778,168 A | 7/1998 | Fuller ..................... 395/182.16 |
| 6,178,519 B1 | 1/2001 | Tucker .......................... 714/4 |
| 6,591,264 B1 * | 7/2003 | Humlicek ...................... 707/8 |

* cited by examiner

Primary Examiner—Bryce P Bonzo
(74) Attorney, Agent, or Firm—Suiter West PC LLO

(57) ABSTRACT

This invention presents a method and system to emulate logging or journaling file systems by means of a snapshot mechanism. Use of the snapshot mechanism reduces the number of system bus calls during log or journal updates and recalls in case of file recovery. The snapshot mechanism is implemented in hardware to provide for speedy and reliable data transfers. Overall system performance thereby is improved with an average reduced number of calls to the system memory bus. The present invention offers a cost effective way of retrofitting existing file systems with a journaling or logging capability.

2 Claims, 2 Drawing Sheets

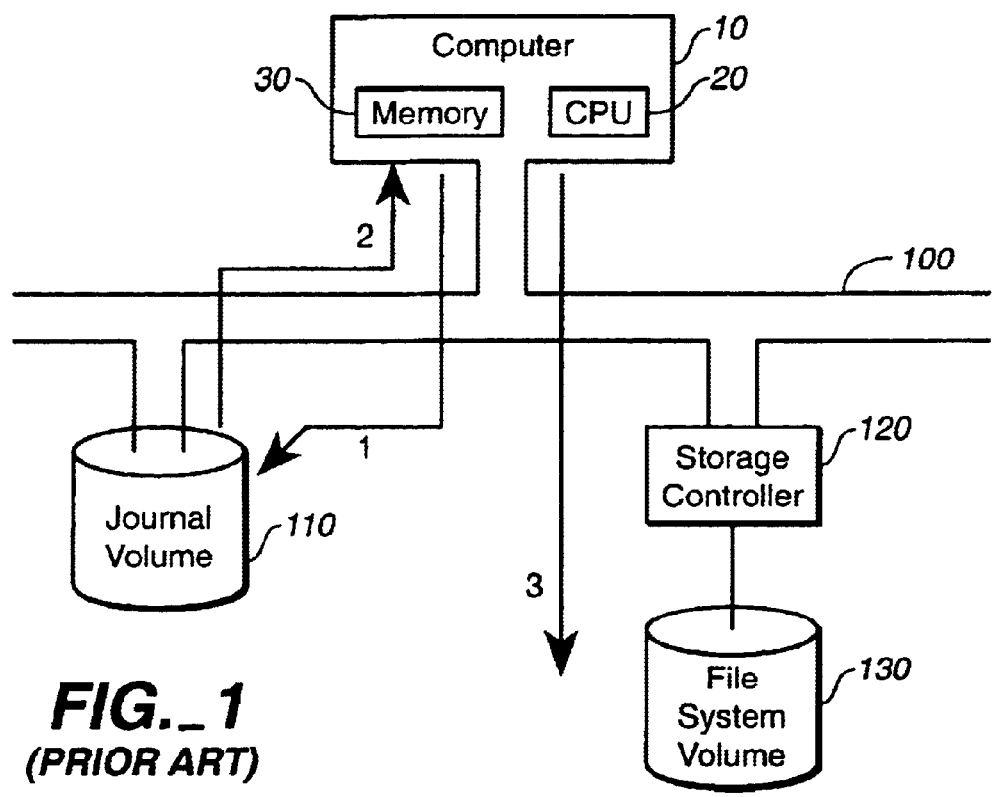
FIG._1
*(PRIOR ART)*
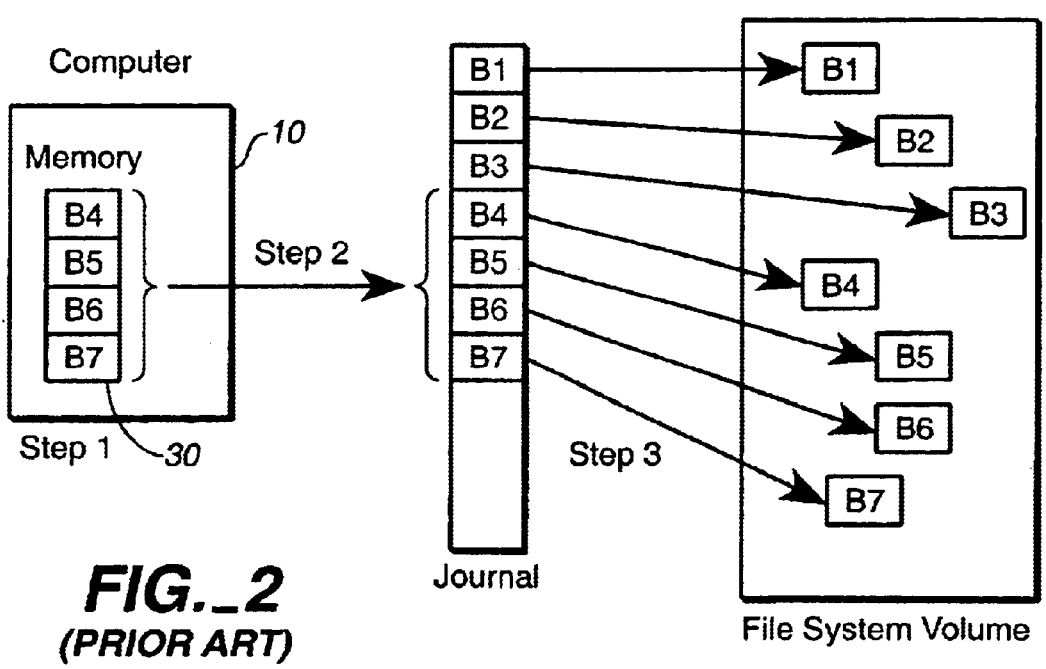
FIG._2
*(PRIOR ART)*

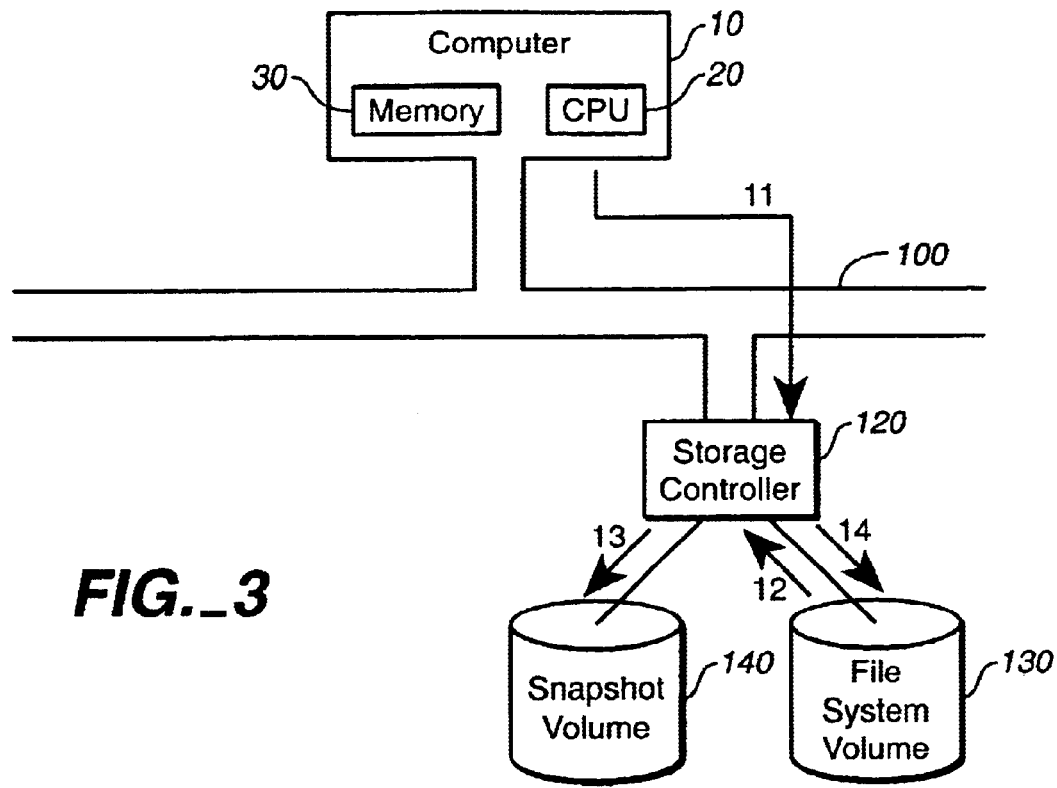
FIG._3
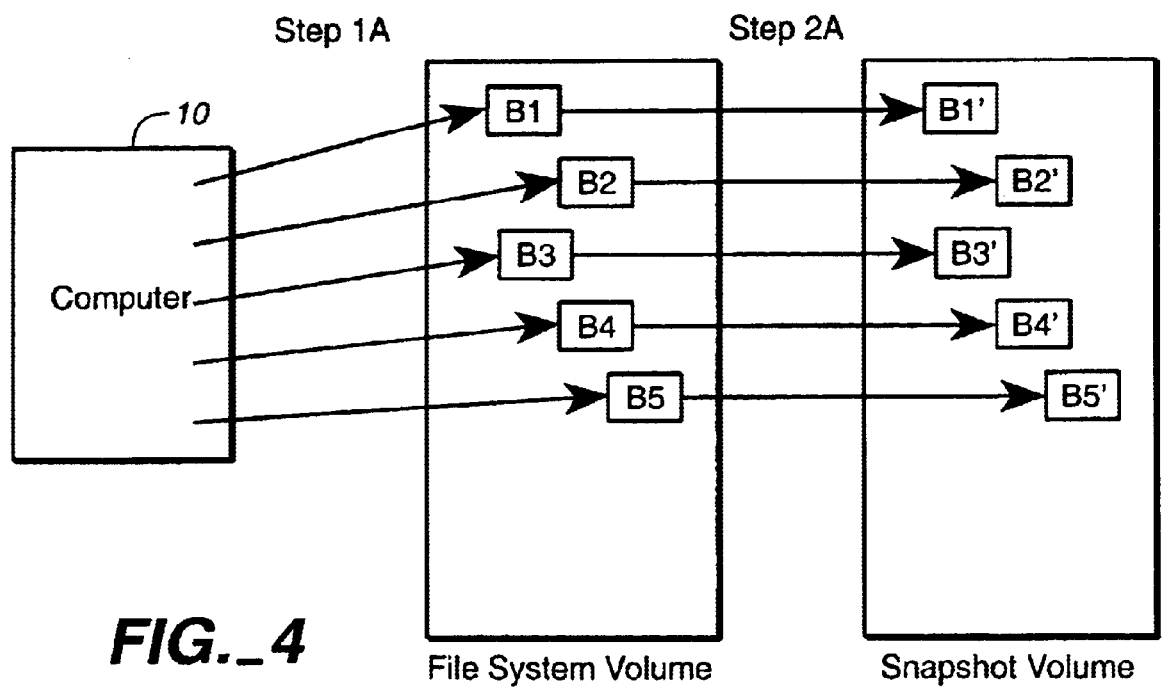
FIG._4

METHOD FOR THE ACCELERATION AND SIMPLIFICATION OF FILE SYSTEM LOGGING TECHNIQUES USING STORAGE DEVICE SNAPSHOTS

FIELD OF THE INVENTION

This invention relates to file system implementations that use "journaling" techniques to reduce the amount of time needed to recover from system crashes and return the file system metadata to a fully consistent state. This invention applies to the problem of implementing logging/journaling capabilities for file systems, especially those that were originally implemented without such mechanisms.

BACKGROUND OF THE INVENTION

In a non-journal file system, blocks are transferred directly from computer memory to the file system volume. A system crash during the transfer results in only a partial copy of the blocks. This often causes corruption. By using a journal, it is possible to ensure that the following hold true: 1) transfers from computer memory to the journal happen in an all-or-nothing fashion (using a sequentially-written journal makes this easy) and 2) transfers from the journal to the file system volume happen in an all-or-nothing fashion. If interrupted by a system crash, the blocks are guaranteed to eventually make it to the file system volume. Likewise, if the transaction's blocks are not written to the journal, they will never make it to the file system volume.

The prior art provides a typical approach in which a new region of on-disk storage for a journal (or log) is reserved to track changes to file system metadata, generally by storing the new version of changed blocks that contain metadata information. Periodically, the changed data is copied from the reserved area back to its desired home location. The home location is on the device that holds the file system. The reserved area for tracking changes may be on this same device or may be on another device. For performance reasons, many journaling file systems still use a separate (i.e., different) device for the journal. The transfer of changed data occurs only under carefully orchestrated conditions. In particular, the transfer is coordinated so that any possible interruption (e.g., system crash, power loss) is guaranteed to leave the file system in either a fully consistent state or in a state that requires only a fast scan and replay of the journal to restore full consistency. From an implementation standpoint, the typical approach is to simply modify key elements of the file system software to understand and manage the new journaling/logging mechanism. However, this approach suffers from serious risks, since the file system code itself must be extremely robust and reliable, and the required changes may impact the core data management code paths of the file system. Furthermore, since the blocks containing changed metadata must be moved from one disk location to another, a fair portion of the I/O system's bandwidth may be consumed due to these transfers.

A typical implementation of a journaling file system is to maintain, at all times, a single transaction that accumulates information about changes to file system metadata. Any file system structural changes that occur while this transaction is active are logged to the journal, which is generally maintained in volatile host system memory (i.e., DRAM). Periodically, this transaction is committed by allowing all application-level file system activity to complete, and then forcing the journal entries from memory to the journal area of physical media. A new transaction is started immediately to track further changes. Eventually, when the journal area fills up, the oldest transaction in the journal will have its data blocks transferred to their home locations on the media, thus freeing up journal space for new transactions to use. In the event of a system crash or other interruption, the file system recovery code need only scan the journal to find the last committed transaction. Any changes that were pending in the transaction that was active at the time of the crash can be ignored, since they had not made any changes to the actual file system's metadata blocks. Changes that were committed to the journal prior to the transaction that was active at the time of the crash will still be in the journal afterwards; their changed blocks will be migrated to the associated home locations on the primary volume over time, just as they would have if no interruption occurred.

FIG. 1 illustrates a logical block diagram of a known journaling file system. File implementations using the journaling techniques reduce the amount of time needed to recover from system crashes and return file system metadata to a fully consistent state. Journaling file systems keep track of changes to a file, specifically, those changes that modify the file's inode. Journaling achieves fast file system recovery because, preferably, at all times the data that is potentially inconsistent with the file system volume could be recorded in the journal. Thus, file system recovery may be achieved by scanning the journal and copying back all committed data into the main file system area. A central concept when considering a journaled file system is the transaction, corresponding to a batch of updates of the file system. This batch includes updates of both data and metadata blocks within the file system. A journal block contains the entire contents of a single block from the file system as updated by a transaction. This means that however small a change is made to a file system block, the entire journal block has to log the change.

In FIG. 2, block changes to the file system accumulate in memory until a decision is made to commit them to stable media (i.e., disk) (step 1). The decision may be based on the elapsed time since the last commit or other criteria. The in-memory batch of blocks constitutes a transaction.

To commit, all that is needed is to write the accumulated blocks along with some "tracking information" to the journal volume (step 2). There may still be prior transactions' data blocks in the journal, so the new data is always appended to it.

When the journal fills up, the journal is emptied by copying each journaled block to its true location on the real file system volume (step 3). After this is done, the journal will be emptied and refilling the journal can be done from the top.

The typical implementation of a journaling file system presents various problems.

One problem with the prior art system is that adding journaling or logging capabilities to an existing file system can be difficult and costly.

Another problem with the prior art system is that making changes to the file system code to implement a journaling system is risky since flaws may manifest themselves in data integrity and availability problems. Furthermore, software based implementations suffer from performance penalties associated with excessive data movement between the journal/log area of the disk and the final place of residence for the data.

SUMMARY OF THE INVENTION

The present invention provides a faster and more reliable way to update a file system by exploiting the similarities between a storage controller hardware-based volume snapshot facility and the data management patterns needed to implement a journaled file system. It allows the file system implementation to leverage the snapshot facility to perform the bulk of the metadata journaling and transfer, and substantially reduces the number of file system code changes needed to implement an effective journaling capability.

The present invention provides a cost effective system to log to a journal using hardware-based snapshots which requires only minimal modification of existing file system code. The notion of a single active transaction may also be applied as this may facilitate comparison with standard implementations.

The present invention facilitates retrofitting file systems which do not have log or journal capabilities since, to start a new transaction, the file system code need only create a new snapshot of the current state of the volume, which is known to be in a consistent state. During the transaction, the file system may operate just like it did in the non-journaled environment, where arbitrary metadata changes are made without any form of logging or journaling. To commit a transaction, all application-level file system activity is allowed to complete, and then the snapshot is reset or deleted. Since the next step will be to start a new transaction, and thus create a new snapshot, it may be possible to combine this last step of the old transaction with the first step of the new transaction. This equates to a re-snap of the volume, where the snapshot is reset to track the current, point-in-time contents of the primary file system.

If an interruption occurs at any point in time, it is handled by rolling back the snapshot's point-in-time image to the base file system volume. This is equivalent to restoring the file system to its state at the time of the most recent transaction commit. Consequently, the interruption is guaranteed to have no adverse effect on the consistency of the file system.

The new mechanism is particularly effective when paired with a copy-on-write implementation of a snapshot. This implementation causes data from the original base volume (i.e., the primary file system volume) to be saved off to a special holding area just before it is overwritten by a WRITE operation to the base volume. With a copy-on-write snapshot, there is a special holding area on the disk media that is used to save the contents of the base volume's blocks just before they get overwritten.

This invention exploits the similarities between a storage controller hardware-based volume snapshot facility and the data management patterns needed to implement a journaled file system. It allows the file system implementation to leverage the snapshot facility to perform the bulk of the metadata journaling and transfer, and substantially reduces the number of file system code changes needed to implement an effective journaling capability. The level of utilization of the system bus is also reduced.

The present invention relates to a method of journaling or logging a file system, comprising the steps of initiating a transaction in which a snapshot of the current state is created of a base volume in which, during the transaction, the file system operates normally and committing the transaction by resetting or deleting the snapshot after all application-level file system activity completes.

The present invention also relates to a system for implementing a journal of a file system in a computer system which has a system bus, comprising a first device for storing the files of the file system and a second device with sufficient memory for storing the journal of the file system, the first device being coupled to the second device, wherein in the case of an interruption to the file system, the second device is used to rebuild the file system.

BRIEF DESCRIPTION OF THE DRAWINGS

FIG. 1 illustrates a journaling computer system of the prior art;

FIG. 2 illustrates a data flow diagram of a typical journaling technique;

FIG. 3 illustrates a preferred embodiment of the invention; and

FIG. 4 illustrates a data flow diagram of the present invention.

DETAILED DESCRIPTION OF THE INVENTION

The present invention is directed to a computer system recovery system which uses hardware to implement journaling or logging functions and which minimizes the number of block data transfers on the system bus for file updating and recovery.

The following terms are used in this document:

Cache memory: High-speed, low-access memory.

Copy-on-write: A method for implementing snapshots of storage volumes, wherein the original contents of the snapshot's base volume are not copied to a separate storage location until an attempt is made to overwrite them.

Inode: A data structure that represents a file within a filesystem consisting of a file's metadata and the numbers of the blocks that can be used to access the file's data.

Metadata: The data an inode stores concerning file attributes and directory entries.

FIG. 3 illustrates an embodiment of the present invention having a computer system which includes a personal computer, work station, minicomputer, mainframe, supercomputer, or the like and accompanying hardware elements. The computer system has a computer 10 which includes a central processing unit (CPU) 20 and memory 30. The computer system includes software modules which are stored in mass storage (not shown) and internal memory 30. The computer executes on central processing unit 20 in response to user inputs.

The snapshot mechanism provides a hardware implementation for storing data from the file system volume 130 to a special holding area. The special holding area may be located on snapshot volume 140. The snapshot mechanism is wholly contained within the storage controller. It may include a microprocessor, memory, and software or firmware. Further details of the snapshot mechanism may be found in related U.S. application Ser. Nos. 09/735,175 and 09/834,823, which are hereby incorporated by reference. Snapshot mechanisms, optionally used in the prior art, have been previously been placed outside the storage controller or were implemented through software. Prior art snapshot mechanisms have not been previously used in file system journaling type or logging type activities.

After creation of the snapshot, the first write to a given block on the file system volume will cause that block's original contents to be saved off to the snapshot holding area. Once the original data has been saved, the new write data will overlay the old data on the base volume.

One feature of the current invention is that data flow occurs through the storage controller between the base volume and the snapshot volume. By using the storage controller, the data transfer path can be optimized.

The snapshot volume 140 is coupled to the storage controller 120. The storage controller is also coupled to the file system volume 130.

The system I/O bus 100 may be any of several types of bus structures. The system bus supports connection of peripheral components to provide a variety of functions. In the context of this invention, the most relevant peripheral component is a block storage device. Various system busses are available, including SCSI, fibre channel, and other suitable busses. These busses provide a communication path between the peripheral components and other system components, such as the central processing unit and memory.

Adding journaling or logging capabilities to an existing file system can be a difficult and costly effort. Many internal structures must be changed within the file system management software to manage the journal or log that tracks metadata changes.

File system code is very intricate and sensitive. Making changes to it is both difficult and risky since flaws may manifest themselves in data integrity and availability issues. Furthermore, software-based implementations suffer from performance penalties associated with excessive data movement between the journal/log area of the disk and the final place of residence for the data. Migrating some of the journal/log management to a storage device can significantly reduce the penalty associated with such data transfers.

An alternative to the copy-on-write snapshot mechanism is known as a split mirror. A split mirror snapshot is made by creating a complete mirror image of all blocks in the base volume, generally by copying (i.e., mirroring) to a second device/volume equal in size to the first. One the mirror is complete, it is split off as the point-in-time image of the base volume. The down sides of the split mirror approach are 1) a full-size copy for the snapshot is needed, even though the base volume may only ever change a little after creating the snapshot and 2) it takes a long time to establish the mirror image since it is a full copy. Therefore, the split mirror is not good for a file journaling scheme.

In the typical prior art journal approach (see FIG. 1), saving an updated metadata block requires three media access transfers across the system bus. The metadata block containing changes is written to the journal 110, resulting in media access 1. Later, wherein flushing the journal's contents back to the file system volume, the changed metadata block is read from the journal, resulting in media access 2. It's possible the metadata block is still in the host system's buffer cache in which case no media access would be needed. The changed metadata block is written back to the base volume 130 through the storage controller 120 over the system bus 100, resulting in media access 3.

In contrast, the invention operates as shown in FIGS. 3 and 4. Saving an updated data or metadata block proceeds in the normal fashion for a non-journalled file system. That is, the file system code simply writes the new data to the file system volume 130, which is also acting as the base volume for the snapshot, step 1A. Within the storage controller 120, this causes a media read and write for the copy-on-write plus a media write at the end for the base volume 130 as well as saving point-in-time image data to the snapshot volume 140, step 2A. B1' is the previous (i.e., consistent) content of B1, B2' is the previous content of B2, etc. No further media accesses are needed in uninterrupted cases.

The copy-on-write creates a point-in-time image. Data is not copied at the time of creation. The storage controller 120 maintains information that allows it to find blocks that are saved during the ensuing copy-on-write operations. If the file system volume has not changed, the storage controller merely reads the data from the file system volume and sends it back to the file system volume. In the copy-on-write, data is overlaid on the file system volume. The data from the file system volume is written to a holding area which could be located on the same physical device as the file system volume. In a copy-on-write, in the case of unchanged data, the data from the file system volume is retrieved.

The snapshot with copy-on-write exhibits features for implementing journaling. The snapshot volume 110 provides a static snapshot of the metadata or other data. The snapshot volume acts as a preservation memory for storing a copy of any of uniquely addressed blocks of metadata.

This invention logs to a journal using hardware-based snapshots, and requires only minimal modification of existing file system code. The notion of a single active transaction can also be applied to it, as this facilitates comparison with standard implementations.

To retrofit an existing file system, a storage controller with a snapshot mechanism replaces the old storage controller or is merely connected, in a system having no storage controller, between the system bus and the file system volume and snapshot volume. This entails the replacement of a single physical device. Additionally, minor changes are made to the file system code so that the code is able to cause the creation and recreation of the snapshot. Recreation of the snapshot causes the changes to be emptied out since the last snapshot. The code changes also include quiescing which puts the system in a consistent state. For restarts and reboots, code is implemented in the storage controller to perform a roll back. This causes the consistent image captured with the snapshot volume to be restored to the file system volume.

In this invention, to start a new transaction, the file system code need only create a new snapshot of the current state of the volume, which is known to be in a consistent state. During the transaction, the file system can operate just like it did in the non-journaled environment, where arbitrary metadata changes are made without any form of logging or journaling. To commit a transaction, all application-level file system activity is allowed to complete, and then the snapshot is reset or deleted. Since the next step will be to start a new transaction, and thus create a new snapshot, it may be possible to combine this last step of the old transaction with the first step of the new transaction. This equates to a re-snap of the volume, where the snapshot is reset to track the current, point-in-time contents of the primary file system.

If an interruption occurs at any point in time, it is handled by rolling back the snapshot's point-in-time image to the file system volume 130. This is equivalent to restoring the file system to its state at the time of the most recent transaction commit. Consequently, the interruption is guaranteed to have no adverse effect on the consistency of the file system.

The invention uses the basic notion of a transaction, but achieves the transactional behavior much differently than conventional journaling.

To begin a transaction, a snapshot (i.e., point-in-time image) is created of the file system volume 130. The file system volume 130 is considered the base volume of this snapshot. The snapshot is thus a fully-consistent, saved image of the file system volume at a point in time where no partial changes were in progress.

Normal, non-journalled file system operations commence on the file system volume 130. This can continue for a fairly arbitrary time duration. During this time, it is likely that any system crash will leave the file system volume with inconsistent internal structures, as with any non-journalled system. However, if a crash does occur, there is a fully-consistent, pre-transaction image of the file system volume, namely, the snapshot volume. The snapshot volume 140 can be used in rebooting to revert the file system volume back to its state just prior to the incomplete transaction. This is a rollback, where the storage controller takes care of reverting the file system volume back to its image at the time of the snapshot creation.

Assuming no crash occurs, the file system operations are eventually paused and the snapshot is simply deleted. All of the changes that happened now constitute a transaction. The transaction is considered to have been committed since there is no longer any snapshot that can be used to revert to the pre-transaction image of the file system volume. A new transaction cycle begins.

In a typical scenario, each write of a filesystem block for the typical approach is likely to require three accesses 1, 2, and 3. Each of the three accesses requires that the full data block pass through the system's memory bus, as well.

With the snapshot-based mechanism, each such modification 11 is likely to require three media accesses 12, 13, and 14 (a first write access, a read access and a second write access). Initially, there is the request 11 from the computer 10 to the storage controller 120 to write data to the file system volume 130. Second, there is a read 12 of the data from the file system volume 130 that needs to be saved for future reference. Third, there is a write 13 of the saved data to the snapshot volume 140. Finally, there is the media access 14 (i.e., write) of the data associated with the original request 11. Only one of the three transfers, namely 11, require that the data flow across the system's memory bus. Since typical system memory buses are bandwidth-limited, they are considered a precious resource. Eliminating two of every three transfers needed for each block update can amount to a substantial performance increase.

It is true that a greater amount of data transfer activity must occur in the event of an interruption. However, from the host software standpoint, this is triggered with a simple "rollback" operational request to the storage controller. The storage controller itself handles all of the associated data transfers between the snapshot or journal volume and the base volume that holds the file system image.

The present invention facilitates retrofitting file systems which do not have log or journal capabilities since, to start a new transaction, the file system code need only create a new snapshot of the current state of the volume, which is known to be in a consistent state.

While the invention has been particularly shown and described with reference to a preferred embodiment it will be understood by those skilled in the art that various changes in form and detail may be made therein without departing from the spirit and scope of the invention.

What is claimed is:

1. A method of journaling or logging a file system, comprising:

resetting or deleting a snapshot after all application-level file system activity completes; and initiating a transaction in which a snapshot of the current state is created of a file system volume in which the snapshot is made through hardware and in which, during the transaction, the file system operates normally, wherein the method is implemented by a computer system in which a computer communicates to a storage controller during the transaction, the method is further implemented by a file system volume and a snapshot volume both of which are coupled to the storage controller, the transaction further comprises a series of read and/or write operations on file system blocks containing either data or file system metadata, any read or write operation is directed to the storage controller for processing, any write operation directed to the storage controller causes a copy-on-write action within the storage controller, a copy-on-write operation is processed within the storage controller by first reading the original data from the file system volume, then writing said original data to the snapshot volume, and then overlaying said original data on the file system with new data, the method involves no more than one data transfer on the system bus per write operation, the snapshot mechanism is wholly contained within the storage controller and comprises a microprocessor, a memory, and either software or firmware, and the file system did not originally have a journaling or logging capability and is being retrofitted to have this capability.

2. The method of claim 1, wherein software for the file system does not manage any form of sequential journal or log.

* * * * *